United States Patent [19]
Yonekawa

[11] Patent Number: 5,515,831
[45] Date of Patent: May 14, 1996

[54] INTERNAL COMBUSTION ENGINE FUEL CONTROL SYSTEM WITH FUEL SUPPLY COMPENSATED FOR HIGH-TEMPERATURE RE-STARTS

[75] Inventor: Masao Yonekawa, Kariya, Japan

[73] Assignee: Nippondenso Co., Ltd., Kariya, Japan

[21] Appl. No.: 326,253

[22] Filed: Oct. 20, 1994

[30] Foreign Application Priority Data

Nov. 1, 1993 [JP] Japan ..................... 5-273715

[51] Int. Cl.$^6$ ........................... F02M 51/00
[52] U.S. Cl. ............................. 123/491
[58] Field of Search ................ 123/491, 422, 123/424, 492, 480, 478, 179.13

[56] References Cited

U.S. PATENT DOCUMENTS

| | | | |
|---|---|---|---|
| 5,220,895 | 6/1993 | Curran et al. | 123/491 |
| 5,301,648 | 4/1994 | Uchinami | 123/491 |
| 5,345,908 | 9/1994 | Nishimura et al. | 123/339 X |
| 5,392,746 | 2/1995 | Pomtoppiddan | 123/491 X |

FOREIGN PATENT DOCUMENTS

| | | |
|---|---|---|
| 56-81230 | 7/1981 | Japan . |
| 1-148042 | 10/1989 | Japan . |
| 5-125984 | 5/1993 | Japan . |

*Primary Examiner*—Raymond A. Nelli
*Attorney, Agent, or Firm*—Cushman, Darby & Cushman

[57] ABSTRACT

A fuel control system for internal combustion engines is disclosed in which a high temperature re-start state is determined based on a physical volume detecting device and a starting state detected by a start state detecting device. A compensation value is determined so as to compensate the amount of fuel supplied during re-start under high temperatures. The compensation value is determined by routines performed within a central processing unit. Variables that affect the compensation value include the physical volume, an internal pressure of a suction pipe, and the starting state of the engine. The compensation value ensures that fuel injection in the engine occurs over an appropriate timing.

25 Claims, 4 Drawing Sheets

FIG. 7
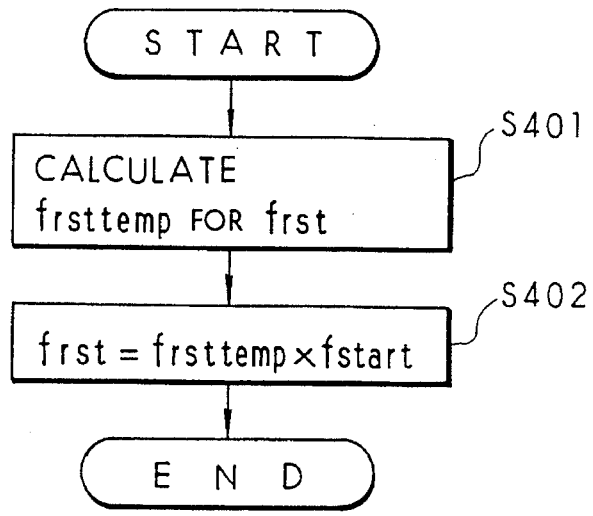
START
↓
CALCULATE frsttemp FOR frst — S401
↓
frst = frsttemp × fstart — S402
↓
END
FIG. 8
| WATER TEMP (°C) / SUCTION PRESSURE (mmHgabs) | 90 | · · · · · | 120 |
|---|---|---|---|
| 0 | $fta_1$ | | $fta_n$ |
| 150 | $ftb_1$ | | $ftb_n$ |
| ⋮ | | | |
| 900 | $ftm_1$ | | $ftm_n$ |
FIG. 9
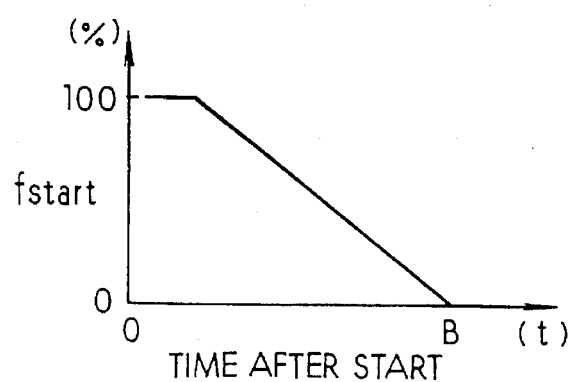
TIME AFTER START

INTERNAL COMBUSTION ENGINE FUEL CONTROL SYSTEM WITH FUEL SUPPLY COMPENSATED FOR HIGH-TEMPERATURE RE-STARTS

CROSS REFERENCE TO RELATED APPLICATIONS

This application is based upon and claims priority from Japanese Patent Application 5-273715, filed Nov. 1, 1993, the contents of which are hereby incorporated herein by reference.

BACKGROUND OF THE INVENTION

1. Field of the Invention

This invention relates to a fuel control system for an internal combustion engine, which compensates the amount of fuel supplied during re-starting the engine under high temperatures.

2. Related Art

An internal combustion engine fuel control system is disclosed in Japanese Patent Laid-Open No. 56-81230.

This fuel control system adds and compensates fuel depending on the fuel temperature, engine cooling water temperature and other factors during re-starting of the engine in order to compensate for an insufficient fuel supply. The presence of an insufficient fuel supply is caused by fuel vapor generation during re-starting of the engine, after the engine had been stopped for a lengthy time (e.g., tens of minutes) following being driven under a high load state and under high temperatures.

However, the amount of vapor generated in the fuel supply cannot completely eradicate an excessive or insufficient fuel supply by compensating the fuel supplied to the engine based upon the temperature only. Driving problems such as a rough idle, in which the idling fails to stabilize, cause the engine to stall or malfunction in other ways.

Another example of a known system that includes certain deficiencies is Japanese Patent Laid-Open No. 5-125984.

This fuel control unit proposes compensation by a reduced amount, wherein the path of the negative pressure of the pressure regulator is switched from a suction pipe pressure (internal suction pipe pressure) to a pipe that discharges into the atmosphere so as to raise the fuel pressure. This also restricts the amount of fuel injected and the fuel pressure can drop below the amount which is demanded by the operating condition.

Since compensation control is limited to cases where the negative pressure path of the pressure regulator can be switched from the suction pipe pressure to the discharge pipe to be discharged into the atmosphere, such a device cannot be used on a fuel control unit having no switching mechanism on the negative pressure path. Usually, such devices are designed to maintain a constant fuel pressure against the suction pipe pressure.

The inventors of the present invention have discovered that in the fuel control unit with no switching mechanism on the negative pressure path of the pressure regulator which is designed to maintain a constant fuel pressure against the suction pipe pressure, the amount of generated vapor is influenced by the changes in the fuel temperature as well as the changes in the fuel pressure (an absolute pressure of fuel) relative to the atmospheric pressure. Thus, the present inventors have developed the present invention in order to overcome the disadvantages with the prior art.

Furthermore, although the amount of fuel supplied to an internal combustion engine can be compensated by detecting the fuel pressure relative to the atmospheric pressure by means of a fuel pressure sensor, such a system raises the cost of manufacturing, which is not desirable.

SUMMARY OF THE INVENTION

An object of the present invention is to develop a fuel control system for an internal combustion engine that compensates the amount of fuel during re-starting of the engine at high temperatures without any additional costs being incurred.

The fuel control system for internal combustion engines according to the present invention includes a fuel pressure control device for maintaining the pressure of fuel supplied to an internal combustion engine at a constant level relative to the internal pressure of a suction pipe located downstream of a throttle valve of the internal combustion engine. The invention further includes a physical volume detecting device for detecting changes in both the physical volume and changes in temperature of the fuel supplied to the engine. A start state detecting device detects the starting state of the internal combustion engine. A suction pipe pressure detecting apparatus detects the internal pressure of the suction pipe located downstream of the throttle valve of the engine. The high temperature starting condition of the engine is determined by a high temperature re-start determination means that determines the starting condition based on the starting state which is a function of the detected physical volume and the detected starting state. The volume of fuel supplied to the engine is compensated depending on the physical volume for a specified period of time after re-start of the engine as well as the detected internal suction pipe pressure when a high temperature re-start state is determined by the high temperature re-start determination means.

In this invention, when the fuel temperature itself is a physical value that is related to the temperature of the fuel supplied to the internal combustion engine, or when the cooling water temperature of the engine is high, thus causing the engine to be in a state having a high re-start temperature, the amount of vapor present with the fuel increases, thus reducing the overall fuel volume. Furthermore, the amount of increase or decrease in the generated vapor is directly proportional to changes in the relative pressures of the fuel and that in the suction pipe. Thus, the amount of vapor is affected not only by the fuel temperature, but also is affected by changes in the suction pipe pressure. Accordingly, when the internal combustion engine is in a high temperature re-start state, the fuel volume in need of compensation over a specified period of time after the re-start of the engine is determined in accordance with the physical volume, which relates to the fuel temperature and the suction pipe pressure.

BRIEF DESCRIPTION OF THE DRAWINGS

Other objects, features and characteristics of the present invention will be apparent, as well as the function of the related elements of the structure, from a study of the following detailed description, the appended claims, and the figures, all of which form a part of this application. In the drawings:

FIG. 7 is another subroutine showing the calculation of high temperature compensation value frst by the CPU according to another embodiment of the present invention;

FIG. 8 is a map showing the initial values frsttemp of high temperature compensation value frst for the suction pipe pressure and the cooling water temperature, with this value being used in the subroutine of FIG. 7; and FIG. 9 is a graph illustrating the compensation gain fstart of elapsed time after the start, which also is used in the subroutine of FIG. 7.

DETAILED DESCRIPTION OF THE PRESENTLY PREFERRED EXEMPLARY EMBODIMENTS

The preferred embodiments of the present invention will now be described with reference to the attached figures.

Figure 1:
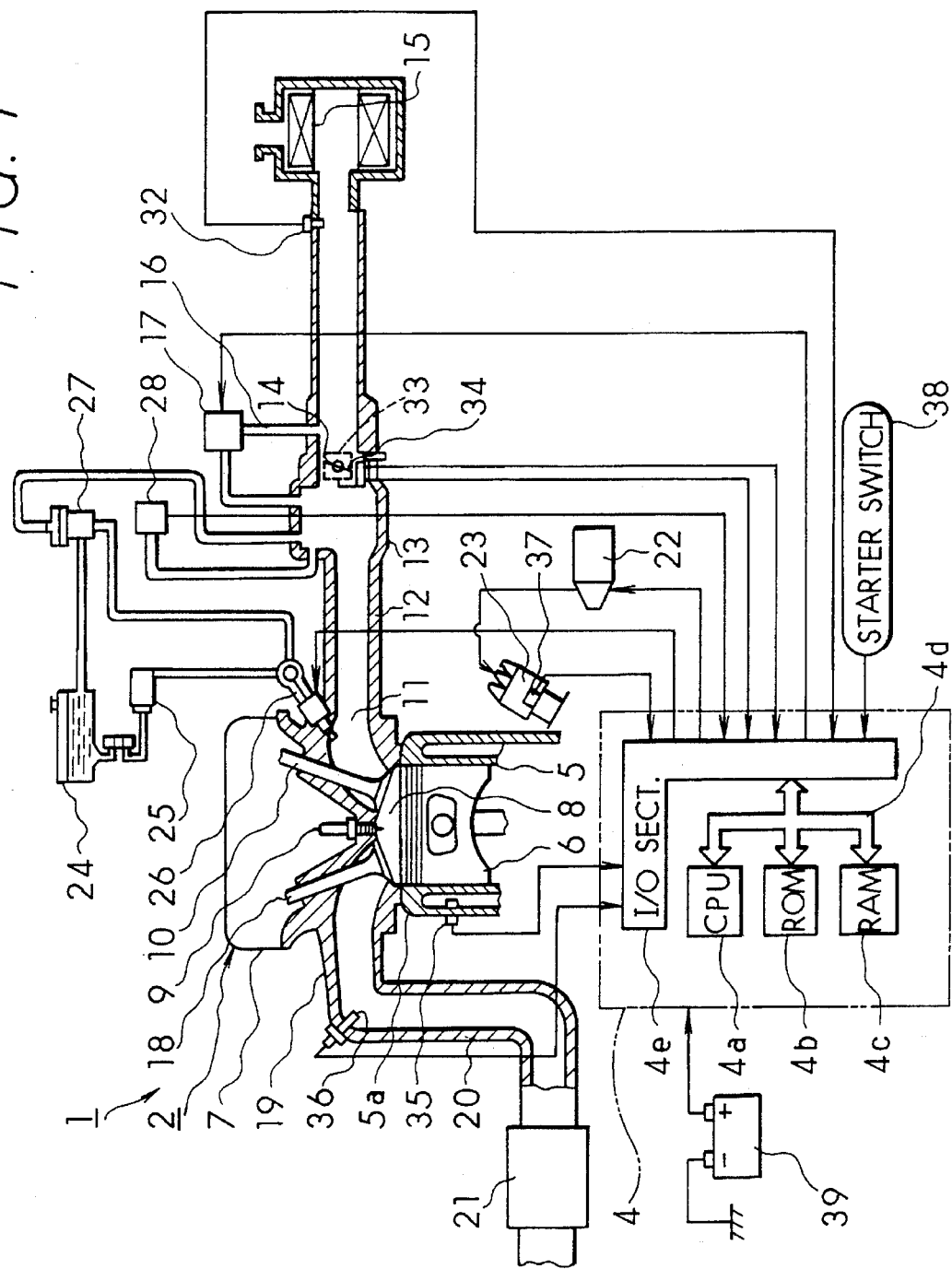
FIG. 1 is an overall structural drawing of a fuel control system for internal combustion engines according to the present invention.

FIG. 1 is an overall structural drawing showing a first embodiment of the present invention.

In FIG. 1, the internal combustion engine fuel control system 1 includes primarily internal combustion engine ("engine") 2 and electronic control unit ("ECU") 4.

Cylinder 5, piston 6 and cylinder head 7 make up combustion chamber 8 of engine 2. Ignition plug 9 is disposed in combustion chamber 8.

The suction line of engine 2 includes suction port 11, suction pipe 12 connected to combustion chamber 8 via suction valve 10, surge tank 13 for absorbing pulses of air being drawn into suction pipe 12, suction air adjusting throttle valve 14, and air cleaner 15. Suction pipe 12 has a bypass path 16 which allows throttle valve 14 to be bypassed and idle speed control valve 17 attached to bypass path 16.

Further, the exhaust line of engine 2 includes exhaust port 19 and exhaust pipe 20 connected to combustion chamber 8 via exhaust valve 18. Exhaust pipe 20 is connected to catalytic converter 21, which purifies the exhaust gas.

The ignition line of engine 2 consists of igniter 22 that outputs the high voltage necessary for ignition. Distributor 23 distributes the high voltage generated by igniter 22 in synchronization with a crankshaft (not illustrated) to ignition plug 9.

A fuel supply line of engine 2 includes fuel tank 24 that stores the fuel, fuel pump 25 that pressurizes and feeds the fuel from tank 24, injector (electromagnetic fuel injection valve) 26 that injects pressurized fuel to suction port 11, and pressure regulator 27 that maintains the fuel pressure at a constant level relative to the suction pipe pressure so as to function as the fuel pressure control means.

Fuel control system 1 includes pressure sensor 28 disposed at the downstream side of throttle valve 14 of suction pipe 12. Pressure sensor 28 detects the pressure within suction pipe 12. Suction air temperature sensor 32 disposed at the downstream side of air cleaner 15 detects the air temperature within suction pipe 12. These sensors function as the physical volume detecting means. Throttle position sensor 33 detects the degree of the opening angle of the throttle in synchronization with the throttle valve 14. Idle switch 34 detects full closure of throttle valve 14. Water temperature sensor 35 is disposed at a cooling line of cylinder block 5a to detect the cooling water temperature of engine 2 and acts as the physical volume detection means. Oxygen sensor 36 disposed in exhaust pipe 20 detects residual oxygen density in exhaust gas and turn angle sensor 37 also acts as a turn speed sensor to emit turn angle signals at each 1/24 turn of the camshaft of distributor 23, that is, at each crank angle 0° and 30° multiplied by integers and acts as the start state detecting means.

Output signals released from the above-described sensors, switches, and the like are input to ECU 4 which in turn controls engine 2 based on these input signals. ECU 4 also receives output signals from a starter switch 38 to detect the driving of the starter (not illustrated) and also receives a voltage signal from battery 39.

The ECU 4 mainly includes CPU 4a, ROM 4b and RAM 4c, which make up a logical operation circuit that is connected to I/O section 4e via common path (bus) 4d to connect the input and output signals with external equipment of the engine fuel control system 1.

Figure 2:
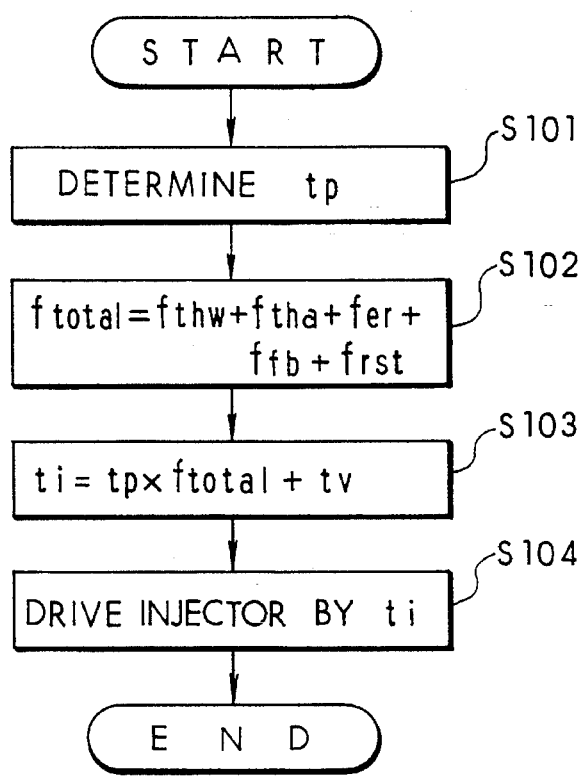
FIG. 2 is the main routine used by the CPU of FIG. 1 for calculating injector injection volume according to the present invention.
Figure 3:
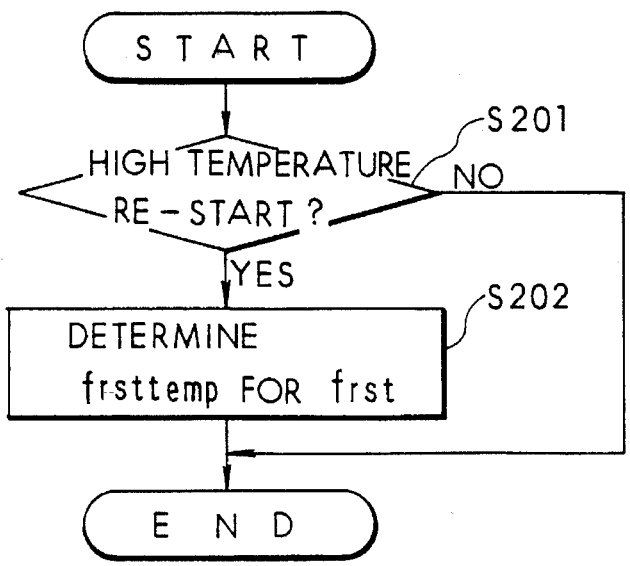
FIG. 3 is a subroutine of the CPU that calculates an initial value frsttemp of high temperature compensation value frst according to the present invention.
Figure 4:
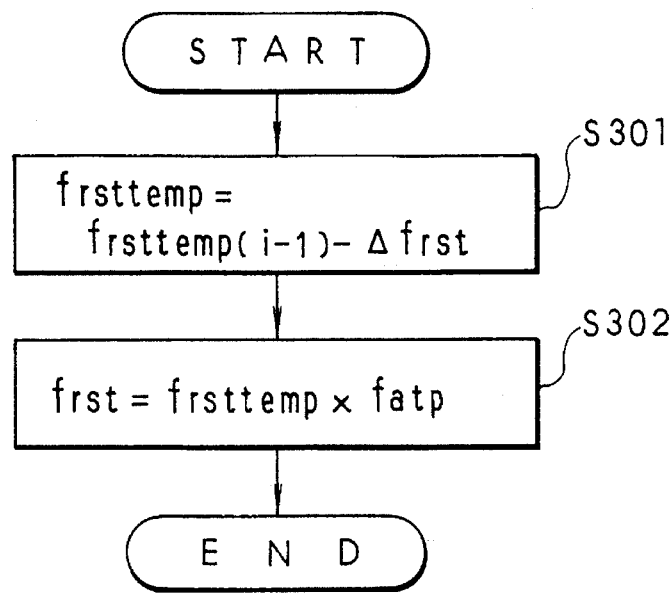
FIG. 4 is a subroutine of the CPU that calculates a high temperature compensation value frst after starting according to the present invention.

The flowcharts depicted in FIGS. 2 through 4 illustrate processing procedures of CPU 4a, which are utilized by engine fuel control system 1 according to the first embodiment of the present invention.

FIG. 2 is concerned with the main routine for calculating the injector injection time and thus the fuel volume from injector 26. In FIG. 2, the basic injection time tp, which becomes the base of fuel volume supplied to engine 2 based on the suction pipe pressure detected by pressure sensor 28 and the turn speed or rotational speed detected by turn angle sensor 37, is determined at step S101.

In step S102, which follows step S101, total compensation value ftotal is calculated. Total compensation value ftotal represents the sum of warm engine compensation value fthw, which is based on the cooling water temperature detected by water temperature sensor 35, suction air temperature compensation value ftha, which is based on the suction air temperature detected by suction air sensor 32, full open compensation value fer determined when the full open state of throttle valve 14 is detected by throttle position sensor 33, feedback compensation value ffb, which is based on the oxygen density in the exhaust gas detected by oxygen sensor 36, and high temperature compensation value frst. These values except for high temperature compensation value frst are all calculated in advance by separate interrupt routines at specified times or by a routine synchronized with the crank angular turn of engine 2. Since the above various compensations by fthw, ftha, fer, and ffb, for instance, are well known in the art, any further description is eliminated hereinbelow for brevity. The determination of high temperature compensation value frst will be described below in detail.

Actual injection time ti is calculated in step S103. Actual injection time ti is calculated by using basic injection time tp from step S101 and ftotal from step S102 in the equation (1):

$$ti = tp \times ftotal + tv \tag{1}$$

where tv is known as invalid injection time, which is obtained from a map (not illustrated) generated in accordance with the voltage value of battery 39.

Step S104 drives injector 26 based on actual injection time ti calculated in step S103, and the processing is completed with respect to this routine.

The routine employed to determine high temperature compensation value frst, needed to calculate the actual injection time ti since frst is necessary to determine ftotal, which is calculated in step S102.

Figure 5:
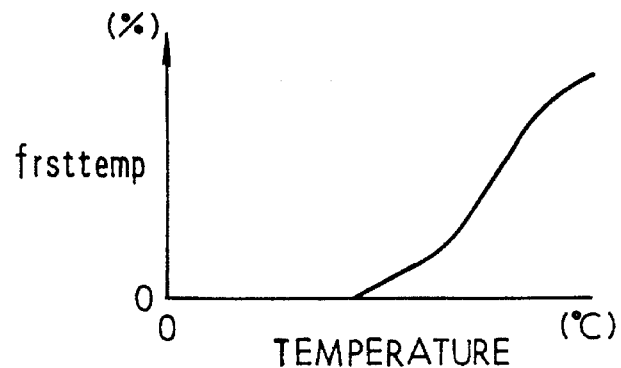
FIG. 5 is a graph illustrating the high temperature compensation value frst as a function of cooling water temperature, with the value from FIG. 5 being used in the subroutine of FIG. 3.

The subroutines used for the calculation of initial value of the high temperature compensation value frsttemp are shown in FIGS. 3 and 5.

The routine illustrated in FIG. 3 is executed only when the output signal from starter switch 38 is at ON and simultaneously the turn speed detected by the turn angle sensor 37, i.e. the cranking of engine 2, is less than 500 rpm, for example.

Step S201 determines whether engine 2 is undergoing a high temperature re-start. If it is determined that a high temperature re-start is occurring, a high temperature determination process is executed. In this process, if the cooling water temperature detected by water temperature sensor 35 is higher than 90° C., for example, and at the same time the suction air temperature detected by suction air temperature sensor 32 is higher than 40° C., for example, a high temperature is determined. If the above conditions are satisfied in the step S201, it is recognized that the system is experiencing a high temperature re-start. Thus, processing proceeds to step S202 wherein an initial value of frsttemp, a fraction of high temperature compensation value frst, relative to the cooling water temperature (°C.) detected by water temperature sensor 35 is calculated from the graph of FIG. 5 and then this program is completed. If any one of the necessary conditions is not met in step S201, the processing routine determines that the system is not experiencing a high temperature re-start before completion of processing.

Figure 6:
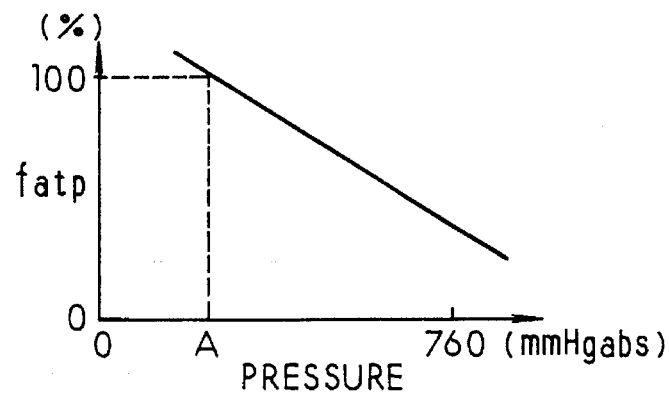
FIG. 6 is a graph illustrating the compensation gain fatp for the suction pipe pressure, with values from FIG. 6 being used in the subroutine of FIG. 4.

A description of the calculation of high temperature compensation value frst after starting engine 2 in the first embodiment is provided with respect to the subroutine shown in FIG. 4 and the graph of FIG. 6.

The routine of FIG. 4 is executed in synchronization with the interruption at each specified time or angular turn of crankshaft of engine 2. In step S301, Δfrst is subtracted from the last value of frsttemp(i–1) of initial value frsttemp of the high temperature compensation value frst at each routine execution and a new value of frsttemp is calculated by the following equation (2):

$$frsttemp = frsttemp(i-1) - \Delta frst \tag{2}$$

A compensation gain fatp (%), which corresponds to the suction pipe pressure (mmHg abs) detected by pressure sensor 28, is calculated from the graph of FIG. 6 in step S302, with the value fatp being used in the calculation of frst. Compensation value frst is found by multiplying frsttemp by fatp Compensation value frst is found in accordance with the following equation (3):

$$frst = frsttemp \times fatp \tag{3}$$

The point A in the graph of FIG. 6 is approximately equal to the suction pipe pressure at idling, a value in the range of from about 200 to 300 mmHg abs. Processing terminates after step S302.

The subroutine for calculating the high temperature compensation value frst according to the second embodiment and illustrated in the flowchart of FIG. 7 will be described with reference being made to the map of FIG. 8 and the graph of FIG. 9. This routine is executed in synchronization with the interruption at each specified time or the crank angular turn of engine 2 after a high temperature re-start has been determined.

In step S401, the suction pipe pressure (mmHg abs) detected by pressure sensor 28 and the cooling water temperature (°C.) detected by water temperature sensor 35 are used to calculate the initial value frsttemp (%) of the high temperature compensation value frst from the map of FIG. 8.

The compensation gain fstart (%) for the time that elapses after a start, i.e., after completion of engine starting, is calculated from the graph of FIG. 9 in step S402. Step S402 also determines a value of frst by multiplying the initial value frsttemp obtained in Step S401 by the result of the calculation as expressed by the following equation (4) then this program is completed.

$$frst = frsttemp \times fstart \tag{4}$$

It should be pointed out that the time elapsed after a start at a point B in the graph of FIG. 9 runs from about 30 seconds to 3 minutes. The time elapsed can be taken as a variable depending on the state of temperature after a start.

It is now clear that the fuel control system for internal combustion engines according to a preferred embodiment of the present invention includes a fuel injector means comprising an injector 26 that injects fuel into engine 2, with the fuel pressure being maintained at a constant level by the fuel pressure control means relative to the internal pressure of suction pipe 12. The fuel control system further includes an injection time control means including CPU 4a, which controls the injection time of the fuel supplied to engine 2 by controlling the valve opening time of injector 26.

The fuel control system also includes a fuel pressure control means including pressure regulator 27 that controls the pressure of fuel supplied to engine 2 so as to maintain the fuel pressure at a constant level relative to the internal pressure of suction pipe 12 (surge tank 13). A physical volume detecting means comprising suction air temperature sensor 32 detects the physical volume that changes along with changes in temperature of the fuel supplied to the engine 2. Furthermore, the physical volume determination is affected by the temperature sensed by water temperature sensor 35. Start state detecting means including a turn angle sensor 37 detects the starting state of the engine 2 and starter switch 38. A signal generating means including a pressure sensor 28 determines the internal pressure of suction valve 12 disposed downstream of throttle valve 14 of engine 2. Pressure sensor 28 outputs a signal corresponding to the pressure. A high temperature restart determination means includes CPU 4a, which determines a high temperature starting condition of engine 2 based on the physical volume detected by the physical volume detecting means and the starting state detecting means. An injection time compensating means also includes CPU 4a, which compensates the injection time of the fuel corresponding to changes in the physical volume detected by the physical volume detecting means for a specified period of time after re-start of engine 2 when a high temperature re-start state is determined. A signal generated by the signal generating means corresponds to the internal pressure of suction pipe 12.

Thus, the fuel volume supplied to an internal combustion engine is compensated not only based upon the volume of vapor generated as a result of changes in a physical volume related to the fuel temperature, but also based upon the volume of vapor generated as a result of changes in fuel pressure caused by variations in the suction pipe pressure relative to the atmospheric pressure.

Accordingly, even if vapor is generated in the fuel supply during a high temperature re-start state of the engine, an appropriate volume of fuel can be supplied through an injector to the engine, due to the compensation values determined by the present invention.

It is possible for high temperature compensation value frst according to the above-described embodiment to be calculated from parameters including only the suction pipe pressure.

Although the determination of a high temperature re-start as described above in connection with the above embodiment is executed in reliance upon both the suction air temperature measured by suction air temperature sensor 32 and the cooling water temperature measured by water temperature sensor 35, the fuel temperature may also be directly detected depending on changes in the physical volume.

Further, although the suction pipe pressure is detected directly by pressure sensor 28 in the above-described embodiment of the present invention, the present invention may also be used on a fuel control system wherein the suction air is estimated by detection with an air flow meter, the extent to which the throttle is open is detected by throttle position sensor 33, and the turn speed or cranking of the engine is detected by turn angle sensor 37. In other words, the suction pipe pressure may be obtained by a reverse estimation based on the basic injection volume tp calculated by the fuel control systems and the turn speed detected by turn angle sensor 37.

As described above, the internal combustion engine fuel control unit according to the present invention provides compensation of fuel volume supplied to the internal combustion engine in accordance with a physical volume and a suction pipe pressure for a specified time after the start of the internal combustion engine when a high pressure re-start state of the internal combustion engine is determined based on a physical volume which varies depending on the temperature of fuel supplied to an internal combustion engine. Since the pressure of fuel supplied to the internal combustion engine is controlled at a constant level relative to the suction pipe pressure, the extent of vapor generation relative to the fuel volume is appropriately compensated so that effects caused by such problems during a high temperature re-start as a rough idle and driving trouble can be prevented.

This invention has been described in connection with what is currently considered to be the most practical and preferred embodiment of the present invention. However, this invention is not intended to be limited to the disclosed embodiments, but rather is intended to cover various modification and alternative arrangements included within the spirit and scope of the appended claims.

What is claimed is:

1. A fuel control system for compensating a supply of fuel to an engine, said system comprising:

suction air temperature sensor means for generating a fuel temperature signal representative of a temperature of air in a suction pipe of said engine;

suction air pressure sensor means for generating a suction air pressure signal representative of a pressure of said suction air;

engine temperature sensor means for generating a engine temperature signal representative of a temperature of said engine;

fuel injector means for supplying said fuel to said engine responsive to an actual fuel injector control signal; and control means for
computing basic injection control data based on preselected detected and measured engine parameters,
computing injector compensation data corresponding to a change in volume of said fuel based on said fuel temperature signal and said suction air pressure signal,
computing actual injector control data based on said basic injection control data and said injector compensation data,
generating said actual injector control signal representative of said actual injector control data, and
applying said actual injector control signal to said fuel-injector means to compensate said supply of fuel to said engine.

2. The system of claim 1 wherein said control means is a programmed microprocessor.

3. The system of claim 1 further comprising engine position sensor means for generating an engine position signal representative of positional information of said engine;

wherein said control means is for computing said basic control data using said engine position signal.

4. The system of claim 3 wherein said control means is for computing said basic control data based on said suction air pressure signal and said engine position signal.

5. The system of claim 1 wherein said control means is for computing said injector compensation value by:

computing a warm engine compensation value based on said engine temperature signal;

computing a suction air temperature compensation value based on said suction air temperature signal;

computing a high temperature compensation value based on preselected detected and measured engine parameters; and computing said injector compensation data based on said warm engine compensation value, said suction air temperature compensation value, and said high temperature compensation value.

6. The system of claim 5, further comprising:

engine position sensor means for generating an engine position signal representative of positional information of said engine; and starting condition sensor means for generating a starting condition signal indicating that said engine is in a starting condition;

wherein said control means is further for
detecting a start state of said engine when said starting condition signal indicates that said engine is in said starting condition and said engine position sensor signal indicates that said engine is rotating at less than a given speed,
detecting a high temperature re-start state when said engine temperature signal indicates that said engine temperature is greater than a given temperature and said suction air temperature signal indicates that said suction air temperature is greater than a give temperature; and
computing said high temperature compensation value upon detection of said high temperature re-start state.

7. The system of claim 5 wherein said control means is for computing said high temperature compensation value based on an adjusted high temperature compensation value and a compensation gain.

8. The system of claim 7 wherein said control means is further for computing said adjusted high temperature compensation value by decrementing a previous high temperature compensation value by a predetermined amount.

9. The system of claim 7 wherein said control means is further for computing said compensation gain based on said suction air pressure signal.

10. The system of claim 7 wherein said control means is further for computing said adjusted high temperature compensation value to be smaller as said suction air pressure becomes higher.

11. The system of claim 7 wherein said control means is further for computing said adjusted high temperature compensation value based on said suction air pressure signal and said engine temperature signal.

12. The system of claim 7 wherein said control means is further for computing said compensation gain based on a time elapsed after engine starting.

13. The system of claim 7 wherein said control means is further for computing said compensation gain to be smaller as said elapsed time becomes larger.

14. A method of compensating a supply of fuel to an engine, said method comprising the steps of:

generating a fuel temperature signal representative of a temperature of air in a suction pipe of said engine;

generating a suction air pressure signal representative of a pressure of said suction air;

generating an engine temperature signal representative of a temperature of said engine;

computing basic injection control data based on preselected detected and measured engine parameters;

computing injector compensation data corresponding to a change in volume of said fuel based on said fuel temperature signal and said suction air pressure signal;

computing actual injector control data based on said basic injection control data and said injector compensation data;

generating an actual injector control signal representative of said actual injector control data;

applying said actual injector control signal to said fuel injector to compensate said supply of fuel to said engine; and supplying said fuel to said engine using a fuel injector responsive to an actual fuel injector control signal.

15. The method of claim 14 further comprising the step of generating an engine position signal representative of positional information of said engine;

wherein said basic injection control step comprises a step of computing said basic control data using said engine position signal.

16. The method of claim 15, said basic control data computing step comprising the step of computing said basic control data based on said suction air pressure signal and said engine position signal.

17. The method of claim 14, said injector compensation value computing step comprising the steps of:

computing a warm engine compensation value based on said engine temperature signal;

computing a suction air temperature compensation value based on said suction air temperature signal;

computing a high temperature compensation value based on preselected detected and measured engine parameters; and computing said injector compensation data based on said warm engine compensation value, said suction air temperature compensation value, and said high temperature compensation value.

18. The method of claim 17, further comprising the steps of:

generating an engine position signal representative of positional information of said engine; and generating a starting condition signal indicating that said engine is in a starting condition;

detecting a start state of said engine when said starting condition signal indicates that said engine is in said starting condition and said engine position sensor signal indicates that said engine is rotating at less than a given speed, detecting a high temperature re-start state when said engine temperature signal indicates that said engine temperature is greater than a given temperature and said suction air temperature signal indicates that said suction air temperature is greater than a give temperature; and computing said high temperature compensation value upon detection of said high temperature re-start state.

19. The method of claim 17, said high temperature compensation value computing step comprising a step of computing said high temperature compensation value based on an adjusted high temperature compensation value and a compensation gain.

20. The method of claim 19, further comprising the step of computing said high temperature compensation value by decrementing a previous high temperature compensation value by a predetermined amount.

21. The method of claim 19, further comprising the step of computing said compensation gain based on said suction air pressure signal.

22. The method of claim 19, further comprising the step of computing said adjusted high temperature compensation value to be smaller as said suction air pressure becomes higher.

23. The method of claim 19, further comprising the step of computing said high temperature compensation value based on said suction air pressure signal and said engine temperature signal.

24. The method of claim 19, further comprising the step of computing said compensation gain based on a time elapsed after engine starting.

25. The method of claim 19, further comprising the step of computing said compensation gain to be smaller as said elapsed time becomes larger.

* * * * *